(12) United States Patent
Komiyama

(10) Patent No.: US 9,904,033 B2
(45) Date of Patent: Feb. 27, 2018

(54) WIDE-ANGLE LENS

(71) Applicant: NIDEC SANKYO CORPORATION, Suwa-gun, Nagano (JP)

(72) Inventor: Tadashi Komiyama, Nagano (JP)

(73) Assignee: NIDEC SANKYO CORPORATION, Suwa-Gun, Nagano (JP)

( * ) Notice: Subject to any disclaimer, the term of this patent is extended or adjusted under 35 U.S.C. 154(b) by 85 days.

(21) Appl. No.: 14/911,147

(22) PCT Filed: Aug. 4, 2014

(86) PCT No.: PCT/JP2014/070499
§ 371 (c)(1),
(2) Date: Feb. 9, 2016

(87) PCT Pub. No.: WO2015/020006
PCT Pub. Date: Feb. 12, 2015

(65) Prior Publication Data
US 2016/0187617 A1   Jun. 30, 2016

(30) Foreign Application Priority Data
Aug. 9, 2013   (JP) .................................. 2013-166339

(51) Int. Cl.
*G02B 3/02* (2006.01)
*G02B 21/02* (2006.01)
(Continued)

(52) U.S. Cl.
CPC ............... *G02B 9/62* (2013.01); *G02B 5/005* (2013.01); *G02B 13/0045* (2013.01);
(Continued)

(58) Field of Classification Search
CPC ........ G02B 13/18; G02B 21/02; G02B 13/04; G02B 13/00; G02B 9/62; G02B 9/60; G02B 9/34
(Continued)

(56) References Cited

U.S. PATENT DOCUMENTS

2012/0170142 A1* 7/2012 Hsieh ..................... G02B 9/62
                                                      359/762
2014/0118845 A1* 5/2014 Komiyama ........ G02B 13/0045
                                                      359/713

FOREIGN PATENT DOCUMENTS

JP   H04267212 A   9/1992
JP   H09304694 A   11/1997
(Continued)

OTHER PUBLICATIONS

International Search Report corresponding to Application No. PCT/JP2014/070499; dated Nov. 4, 2014, with English translation.

*Primary Examiner* — Dawayne A Pinkney
(74) *Attorney, Agent, or Firm* — Cantor Colburn LLP

(57) ABSTRACT

A wide-angle lens may include a first lens having negative power; a second lens being a plastic lens having negative power, wherein at least one of an object side lens face and an image side lens face is an aspherical surface; a third lens being a plastic lens having negative power, wherein at least one of an object side lens face and an image side lens face is an aspherical surface; a fourth lens having positive power; a fifth lens being a plastic lens; a sixth lens being a plastic lens, wherein the fifth lens and the sixth lens constitute a cemented lens having positive power; and a diaphragm disposed between the fourth lens and the cemented lens. The effective focal length "f" and the focal length "$f_3$" may satisfy the relationship: $|f/f_3|<0.2$.

15 Claims, 10 Drawing Sheets

(51) Int. Cl.
*G02B 13/04* (2006.01)
*G02B 9/62* (2006.01)
*G02B 9/60* (2006.01)
*G02B 13/00* (2006.01)
*G02B 5/00* (2006.01)
*G02B 13/18* (2006.01)
*G02B 27/00* (2006.01)
*G02B 13/06* (2006.01)

(52) U.S. Cl.
CPC ............ *G02B 13/06* (2013.01); *G02B 13/18* (2013.01); *G02B 27/0025* (2013.01)

(58) Field of Classification Search
USPC ................ 359/713, 714, 658–659, 752–753, 359/756–757, 761–763, 770
See application file for complete search history.

(56) References Cited

FOREIGN PATENT DOCUMENTS

| | | |
|---|---|---|
| JP | 2009063877 A | 3/2009 |
| JP | 2012098724 A | 5/2012 |
| JP | 2012103319 A | 5/2012 |
| JP | 2014085559 A | 5/2014 |
| KR | 20100136832 A | 12/2010 |
| WO | 2012008694 A1 | 1/2012 |

* cited by examiner

Astigmatism / Distortion

Magnification Chromatic Aberration

Spherical Aberration

Astigmatism / Distortion

Magnification Chromatic Aberration

Spherical Aberration

Astigmatism / Distortion

Magnification Chromatic Aberration

Spherical Aberration

Astigmatism / Distortion

Magnification Chromatic Aberration

Spherical Aberration

WIDE-ANGLE LENS

CROSS REFERENCE TO RELATED APPLICATIONS

This is the U.S. national stage of application No. PCT/JP2014/070499, filed on Aug. 4, 2014. Priority under 35 U.S.C. § 119(a) and 35 U.S.C. § 365(b) is claimed from Japanese Applications No. 2013-166339, filed Aug. 9, 2013, the disclosure of which is incorporated herein by reference.

FIELD OF THE INVENTION

The present invention relates to a wide-angle lens which is used in various image pickup systems.

BACKGROUND

A wide angle and a high resolution are required in a lens which is mounted on a monitoring camera, an on-vehicle camera and a camera for a portable device. In order to meet the requirement, a wide-angle lens has been proposed which is constituted of five lenses in four groups which includes, from an object side toward an image side, a first lens having negative power, a second lens having negative power, a third lens having positive power, a diaphragm, and a cemented lens (fourth lens and fifth lens) having positive power (see Patent Literature 1).

PATENT LITERATURE

[PTL 1] Japanese Patent Laid-Open No. 2009-63877

However, in the lens constitution described in Patent Literature 1, in order to secure a viewing angle of 130° or more, a lens face on an image side of the first lens becomes a shape close to a hemisphere and thus a yield and productivity are decreased and its cost is increased. Especially, in a case that the first lens is a glass lens, work for the first lens is difficult and, as a result, its cost is easily increased.

SUMMARY

In view of the problem described above, at least an embodiment of the present invention provides a wide-angle lens in which a lens shape of the first lens which is a meniscus lens is easily produced and its aberration is further improved even in a case that its viewing angle of 130° or more is secured.

To achieve the above, at least an embodiment of the present invention provides a wide-angle lens whose horizontal viewing angle is 130° or more and which has a lens constitution of six lenses in five groups. The wide-angle lens includes a first lens which is a first lens from an object side and is a plastic lens or a glass lens having negative power with a convex surface facing the object side and a concave surface facing an image side, a second lens which is a second lens from the object side and is a plastic lens having negative power with a concave surface facing the image side and at least one of an object side lens face and an image side lens face is an aspherical surface, a third lens which is a third lens from the object side and is a plastic lens having negative power with a concave surface facing the object side and at least one of an object side lens face and an image side lens face is an aspherical surface, a fourth lens which is a fourth lens from the object side and is a plastic lens or a glass lens having positive power with a convex surface facing the image side, a fifth lens which is a fifth lens from the object side and is a plastic lens, a sixth lens which is a sixth lens from the object side and is a plastic lens, and the fifth lens and the sixth lens constitute a cemented lens having positive power, and a diaphragm which is disposed between the fourth lens and the cemented lens. When an effective focal length is "f" and a focal length of the third lens is "$f_3$", the effective focal length "f" and the focal length "$f_3$" satisfy the following relationship;

$$|f/f_3|<0.2$$

In at least an embodiment of the present invention, in addition to two lenses (the first lens and the second lens) having negative power, the third lens having negative power is provided and thus the negative power of the first lens and the second lens can be compensated by the third lens. Therefore, angles (tangent angle) formed between the tangential lines to the concave surfaces on the image side of the first lens and the second lens and the optical axis can be increased and thus the concave shapes of the lenses are easily produced. Accordingly, the costs of the first lens and the second lens can be reduced. Further, the third lens is an aspherical lens and, in addition, the constitution under the above-mentioned conditional expression is satisfied and thus, the astigmatism and the comatic aberration (lateral aberration) can be reduced and, even when the "F"-value is set brightly, the aberration can be corrected.

In at least an embodiment of the present invention, it is preferable that, when a radius of curvature of an image side lens face of the fifth lens and an object side lens face of the sixth lens is "$r_{52,61}$" and a focal length of the fifth lens is "$f_5$", the radius of curvature "$r_{52,61}$" and the focal length "$f_5$" satisfy the following relationship;

$$|r_{52,61}/f_5|<0.5$$

According to this constitution, the chromatic aberration can be reduced.

In at least an embodiment of the present invention, it is preferable that, when an Abbe number of the third lens is "$v_3$", the Abbe number "$v_3$" satisfies the following relationship;

$$v_3>50$$

According to this constitution, the chromatic aberration can be reduced.

In at least an embodiment of the present invention, it is preferable that, when an angle formed between a tangential line to an image side lens face of the first lens and the optical axis is θ, the angle θ satisfies the following relationship;

$$\theta>20°$$

According to this constitution, an angle (tangent angle) formed between the tangential line to the concave surface on the image side of the first lens and the optical axis can be increased and thus the first lens is easily produced. Therefore, the cost of the first lens can be reduced.

In at least an embodiment of the present invention, it is preferable that the fourth lens is a glass lens. According to this constitution, lowering of resolution due to temperature change can be suppressed.

In at least an embodiment of the present invention, it is preferable that all the lens faces of the plastic lenses except the object side lens face of the first lens are aspherical surfaces. According to this constitution, the aberration can be further effectively reduced.

In at least an embodiment of the present invention, in addition to two lenses (the first lens and the second lens) having negative power, the third lens having negative power is provided and thus the negative power of the first lens and the second lens can be compensated by the third lens. Therefore, angles (tangent angle) formed between the tangential lines to the concave surfaces on the image side of the first lens and the second lens and the optical axis can be increased and thus the concave shapes of the lenses are easily produced. Accordingly, costs of the first lens and the second lens can be reduced. Further, the third lens is an aspherical lens and, in addition, the effective focal length "f" and the focal length "$f_3$" of the third lens satisfy the following relationship;

$$|f/f_3|<0.2$$

Therefore, the astigmatism and the comatic aberration (lateral aberration) can be reduced and, even when the "F"-value is set brightly, the aberration can be corrected.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Embodiments of a wide-angle lens to which at least an embodiment of the present invention is applied will be described below with reference to the accompanying drawings.

First Embodiment (Schematic Constitution)

Figure 1A:
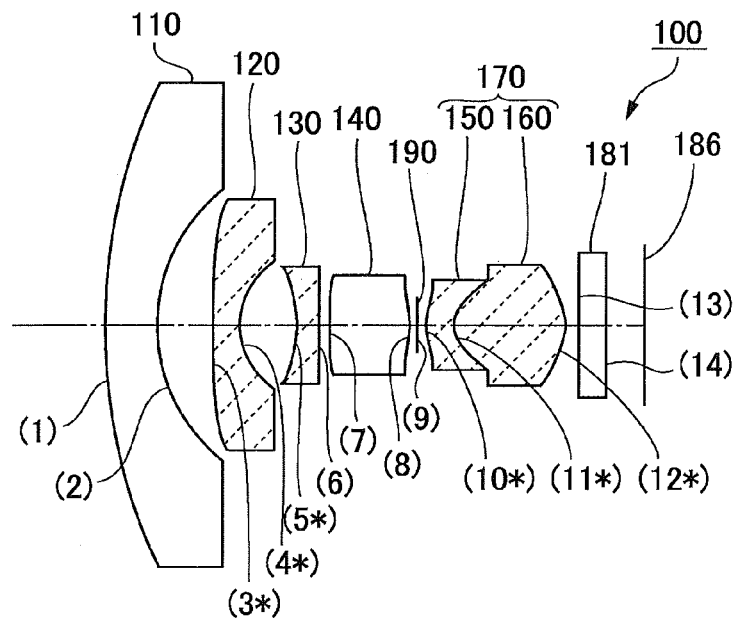
FIGS. 1A, 1B, 1C and 1D are explanatory views showing a wide-angle lens in accordance with a first embodiment of the present invention.
Figure 1B:
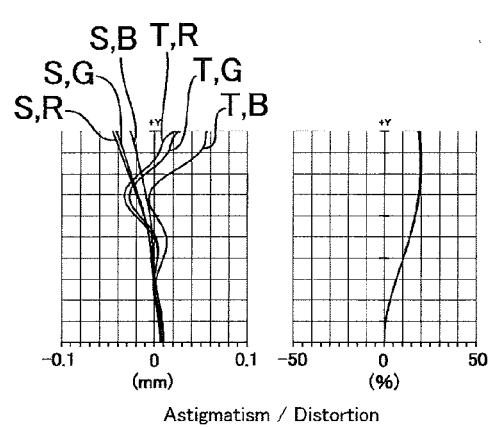
Figure 1D:
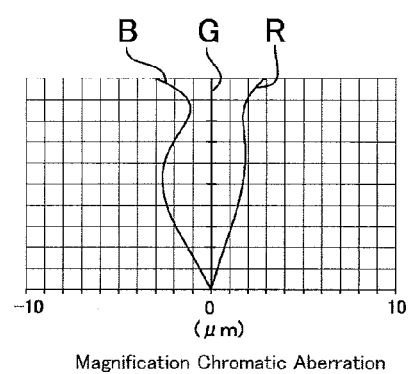
Figure 1C:
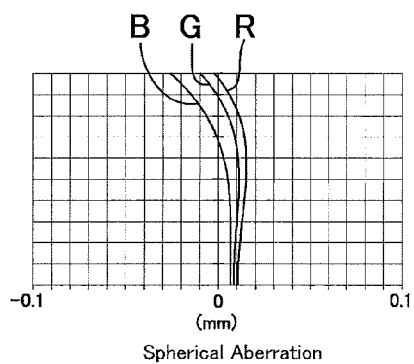
Figure 2B:
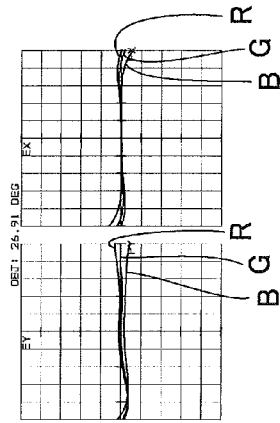
FIGS. 2A, 2B, 2C, 2D and 2E are explanatory views showing simulation results of lateral aberration in respective viewing angles of the wide-angle lens in accordance with the first embodiment of the present invention.
Figure 2E:
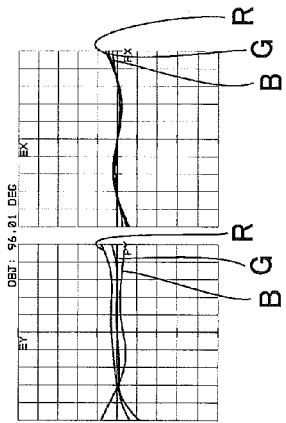
Figure 2C:
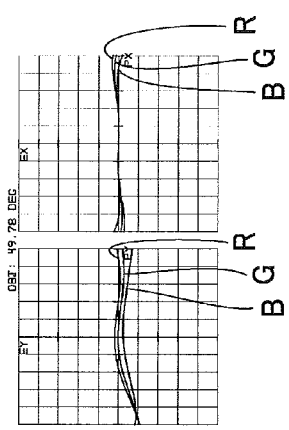
Figure 2A:
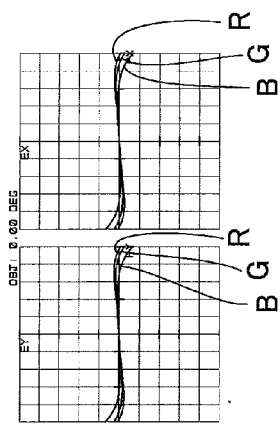
Figure 2D:
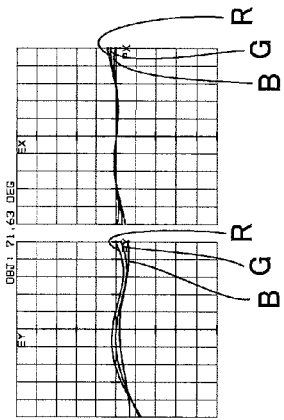

FIGS. 1A, 1B, 1C and 1D are explanatory views showing a wide-angle lens in accordance with a first embodiment of the present invention. FIG. 1A is an explanatory view showing a lens constitution, FIG. 1B is an explanatory view showing simulation results of the astigmatism and the distortion, FIG. 1C is an explanatory view showing simulation results of the spherical aberration, and FIG. 1D is an explanatory view showing simulation results of the magnification chromatic aberration. FIGS. 2A, 2B, 2C, 2D and 2E are explanatory views showing simulation results of the lateral aberration in respective viewing angles of the wide-angle lens in accordance with the first embodiment of the present invention. FIG. 2A is an explanatory view showing the lateral aberration when its viewing angle is 0°, FIG. 2B is an explanatory view showing the lateral aberration when its viewing angle is 26.91°, FIG. 2C is an explanatory view showing the lateral aberration when its viewing angle is 49.78°, FIG. 2D is an explanatory view showing the lateral aberration when its viewing angle is 71.63°, and FIG. 2E is an explanatory view showing the lateral aberration when its viewing angle is 96.01°. The distortion indicates a variation ratio of an image between an imaging center part and a peripheral part and, the smaller the absolute value of a numerical value indicating the distortion is, the higher the precision of the lens is.

In FIG. 1A, respective faces 1 through 12 are indicated with a parenthesis and an aspherical surface is added with "*". Further, regarding aberrations, aberrations of red light "R" (wavelength 656 nm), green light "G" (wavelength 588 nm) and blue light "B" (wavelength 486 nm) are shown. In FIG. 1B, the "S" is added in the characteristic in a sagittal direction and the "T" is added in the characteristic in a tangential direction. FIGS. 3A, 3B, 3C and 3D, FIGS. 5A, 5B, 5C and 5D, FIGS. 7A, 7B, 7C and 7D, and FIGS. 9A, 9B, 9C and 9D described below are similarly shown as described above.

As shown in FIG. 1A, a wide-angle lens 100 to which at least an embodiment of the present invention is applied is provided with a horizontal viewing angle of 130° or more and has a lens constitution of six lenses in five groups having, from an object side to an image side, a first lens 110, a second lens 120, a third lens 130, a fourth lens 140, a diaphragm 190 and a cemented lens 170 (fifth lens 150 and sixth lens 160). A filter 181 and an imaging element 186 are disposed on an image side with respect to the cemented lens 170.

The first lens 110 which is the first from the object side is a plastic lens or a glass lens having negative power in a meniscus shape with a convex surface facing the object side and a concave surface facing the image side. The second lens 120 which is the second from the object side is a plastic lens having negative power with a concave surface facing the image side. At least one of its object side lens face and its image side lens face is an aspherical surface. The third lens 130 which is the third from the object side is a plastic lens having negative power with a concave surface facing the object side. At least one of its object side lens face and its image side lens face is an aspherical surface. The fourth lens 140 which is the fourth from the object side is a plastic lens or a glass lens having positive power with a convex surface facing the image side. Both of the fifth lens 150 which is the fifth from the object side and the sixth lens 160 which is the sixth from the object side are plastic lens. The fifth lens 150 and the sixth lens 160 constitute the cemented lens 170 having positive power. The diaphragm 190 is disposed between the fourth lens 140 and the cemented lens 170.

Respective constitutions of the wide-angle lenses 100 constituted as described above are shown in Table 1. The following items of the wide-angle lenses 100 are shown in the upper column in Table 1.

TABLE 1

| Embodiment | f | TTL | f3 | r52 · 61 | f5 |
|---|---|---|---|---|---|
| 1 | 0.900 | 13.371 | −6.654 | 0.585 | −1.457 |
| 2 | 0.795 | 13.231 | −29.063 | 0.700 | −1.707 |
| 3 | 1.000 | 16.506 | −11.775 | 0.724 | −1.595 |
| 4 | 0.994 | 16.974 | −16.300 | 0.767 | −1.834 |
| 5 | 1.274 | 14.225 | −25.838 | 0.800 | −1.858 |

| Embodiment | f/TTL | v3 | \|f/f3\| | \|r52 · 61/f5\| | Min. Value of Tangent Angle θmin |
|---|---|---|---|---|---|
| 1 | 0.067 | 55.8 | 0.135 | 0.401 | 38.0 |
| 2 | 0.060 | 55.8 | 0.027 | 0.410 | 24.2 |
| 3 | 0.061 | 55.8 | 0.085 | 0.454 | 25.4 |
| 4 | 0.059 | 55.8 | 0.061 | 0.418 | 24.2 |
| 5 | 0.090 | 55.8 | 0.049 | 0.431 | 45.0 |

Effective focal length=f
Object-image distance=TTL
Focal length of the third lens 130=$f_3$
Radius of curvature of an image side lens face of the fifth lens 150 and an object side lens face of the sixth lens 160=$r_{52.61}$
Focal length of the fifth lens 150=$f_5$
Further, the following items of the wide-angle lenses 100 are shown in the lower column in Table 1.
Ratio between the effective focal length and the object-image distance=f/TTL
Abbe number of the third lens 130=$v_3$
Ratio between the effective focal length and the focal length of the third lens 130=$f/f_3$
Absolute value of the ratio between the radius of curvature $r_52.61$ and the focal length of the fifth lens 150=$|r_{52.61}/f_5|$
Minimum value of a tangent angle θ of an image side lens face of the first lens 110=θmin The tangent angle θ means an angle formed between a tangential line to an image side lens face of the first lens 110 and the optical axis "L". The minimum value θmin of the tangent angle θ corresponds to an angle formed between the tangential line to the outermost peripheral side of the image side lens face of the first lens 110 and the optical axis "L".

In Table 1, in addition to the respective constitutions of the wide-angle lens 100 in this embodiment (First Embodiment), respective constitutions of the wide-angle lenses 100 of Second through Fifth Embodiments described below are shown. Further, the unit of the focal length and the like in Table 1 is "mm".

As shown in Table 1, in the wide-angle lens 100 to which at least an embodiment of the present invention is applied, the effective focal length "f" and the focal length "$f_3$" of the third lens 130 satisfy the following relationship;

$|f/f_3|<0.2$

In the wide-angle lens 100 to which at least an embodiment of the present invention is applied, the radius of curvature "$r_{52.61}$" of the image side lens face of the fifth lens 150 and the object side lens face of the sixth lens 160 and the focal length "$f_5$" of the fifth lens 150 satisfy the following relationship;

$|r_{52.61}/f_5|<0.5$

Further, in the wide-angle lens 100 to which at least an embodiment of the present invention is applied, when the Abbe number of the third lens 130 is "$v_3$", the Abbe number "$v_3$" satisfies the following relationship;

$v_3>50$

Further, in the wide-angle lens 100 to which at least an embodiment of the present invention is applied, the minimum value θmin of the tangent angle θ is 20° or more. Therefore, an angle (tangent angle θ) formed between a tangential line to the image side lens face (face 2) of the first lens 110 and the optical axis "L" satisfies the following relationship at any position of the image side lens face (face 2) of the first lens 110;

θ>20°

(Specific Constitution)

The specific constitutions of the wide-angle lens 100 in accordance with the first embodiment of the present invention are shown in Table 2.

TABLE 2

| | | | | | |
|---|---|---|---|---|---|
| Effective Focal Length | | | 0.900 mm | | |
| Total Track | | | 13.371 mm | | |
| Image Space F/# | | | 2.0 | | |
| Max. Field Angle | | | 218 deg | | |
| Horizontal Field Angle | | | 192 deg | | |

| Surf | Radius | Thickness | Nd | vd | fn |
|---|---|---|---|---|---|
| 1 | 13.500 | 1.300 | 1.835 | 43.1 | −7.797 |
| 2 | 4.200 | 1.350 | | | |
| 3* | 27.400 | 0.700 | 1.531 | 55.8 | −2.910 |
| 4* | 1.450 | 1.420 | | | |
| 5* | −3.250 | 0.600 | 1.531 | 55.8 | −6.654 |
| 6 | −43.000 | 0.200 | | | |
| 7 | 9.000 | 2.000 | 1.923 | 20.9 | 3.500 |
| 8 | −4.500 | 0.200 | | | |
| 9(stop) | Infinity | 0.206 | | | |
| 10* | 2.330 | 0.700 | 1.635 | 24.0 | −1.457 |
| 11* | 0.585 | 2.720 | 1.531 | 55.8 | 1.463 |
| 12* | −1.450 | 0.350 | | | |
| 13 | Infinity | 0.700 | 1.517 | 64.2 | |
| 14 | Infinity | 0.925 | | | |

| Aspherical Coefficient | | | | | | |
|---|---|---|---|---|---|---|
| Surf | c (1/Radius) | K | A4 | A6 | A8 | A10 |
| 3 | 3.64964E−02 | 0.00000E+00 | −1.50212E−03 | 5.14174E−04 | −1.23272E−05 | 0.00000E+00 |
| 4 | 6.89655E−01 | −1.52000E+00 | −2.15312E−02 | 2.97280E−02 | −1.44598E−02 | 3.62426E−03 |

TABLE 2-continued

| | | | | | | |
|---|---|---|---|---|---|---|
| 5 | −3.07692E−01 | 0.00000E+00 | −1.93552E−02 | 7.01460E−03 | −1.53493E−03 | 0.00000E+00 |
| 10 | 4.29185E−01 | −5.10000E+00 | −1.70207E−03 | 4.47747E−03 | −1.78822E−03 | 3.87319E−04 |
| 11 | 1.70940E+00 | −1.05000E+00 | −1.31169E−01 | 7.09796E−02 | −2.32916E−02 | 3.86636E−03 |
| 12 | −6.89655E−01 | −2.20000E+00 | 3.34607E−03 | −2.56162E−03 | 1.14508E−03 | 0.00000E+00 |

In the upper column in Table 2, the following items are shown;
Effective focal length "f" of the entire lens system (Effective Focal Length)
Object-image distance (Total Track)
"F"-value of the entire lens system (Image Space F/#)
Maximum viewing angle (Max. Field Angle)
Horizontal viewing angle (Horizontal Field Angle)
In the middle column in Table 2, the following items of the respective faces are shown;
Radius of curvature (Radius)
Thickness
Refractive index "Nd"
Abbe number "vd"
Focal length "fn"

In the lower column in Table 2, the aspherical coefficients A4 through A10 when a shape of an aspherical surface is expressed by the following expression (Expression 1) are shown. In the following expression, the axis in the optical axis "L" direction is "z", the height in a direction perpendicular to the optical axis "L" is "r", and the conical coefficient is "k".

$$z = \frac{cr^2}{1+\sqrt{(1-(1+k)c^2r)}} + \sum_{n=2}^{5} A_{2n}|r|^{2n} \quad \text{[Expression 1]}$$

The unit of the radius of curvature, the thickness and the focal length is "mm". Tables 3 through 6 described below are similarly shown as described above.

As can be seen from FIG. 1A and Table 2, a horizontal viewing angle of the wide-angle lens 100 in this embodiment is 192°. In the wide-angle lens 100 in this embodiment, the first lens 110 is a glass lens having negative power in a meniscus shape with a convex surface facing the object side and a concave surface facing the image side. Both of the object side lens face (face 1) and the image side lens face (face 2) are spherical surfaces. The second lens 120 is a plastic lens having negative power in a meniscus shape with a convex surface facing the object side and a concave surface facing the image side. Both of the object side lens face (face 3) and the image side lens face (face 4) are aspherical surfaces. The third lens 130 is a plastic lens having negative power in a meniscus shape with a concave surface facing the object side and a convex surface facing the image side. The object side lens face (face 5) is an aspherical surface and the image side lens face (face 6) is a spherical surface. The fourth lens 140 is a glass lens with a convex surface facing the object side and a convex surface facing the image side. Both of the object side lens face (face 7) and the image side lens face (face 8) are spherical surfaces.

The fifth lens 150 is a plastic lens having negative power with a convex surface facing the object side and a concave surface facing the image side. Both of the object side lens face (face 10) and the image side lens face (face 11) are aspherical surfaces. The sixth lens 160 is a plastic lens with a convex surface facing the object side and a convex surface facing the image side. Both of the object side lens face (face 11) and the image side lens face (face 12) are aspherical surfaces. The image side lens face of the fifth lens 150 and the object side lens face of the sixth lens 160 are cemented together to constitute the cemented lens 170 having positive power.

As described above, in the wide-angle lens 100 in this embodiment, in addition to two lenses (the first lens 110 and the second lens 120) having negative power, the third lens 130 having negative power is provided and thus the negative power of the first lens 110 and the second lens 120 can be compensated by the third lens 130. Therefore, angles (tangent angle θ) formed between the tangential lines to the concave surfaces on the image side of the first lens 110 and the second lens 120 and the optical axis "L" can be increased and thus the concave shapes of the lenses are easily produced. Accordingly, the costs of the first lens 110 and the second lens 120 can be reduced.

Especially, the minimum value θmin of the tangent angle θ to the image side lens face (face 2) of the first lens 110 is 38.0° and, in the image side lens face (face 2) of the first lens 110, a value of the tangent angle θ is more than 20° at any position. Therefore, the first lens 110 is formed in an easily produced shape and thus the cost of the first lens 110 can be reduced.

In this embodiment, the third lens 130 is an aspherical lens. Further, the absolute value |f/f₃| of the ratio between the effective focal length "f" and the focal length "f₃" of the third lens 130 is 0.135, which is less than 0.2. Therefore, as shown in FIGS. 1B and 1C and FIGS. 2A, 2B, 2C, 2D and 2E, the astigmatism, the distortion, the spherical aberration and the comatic aberration (lateral aberration) can be reduced and, even when the "F"-value is set brightly, the aberration can be corrected.

The third lens 130 is a glass lens and thus lowering of the resolution due to temperature change can be suppressed.

The absolute value $|r_{52.61}/f_5|$ of the ratio between the radius of curvature $r_{52.61}$ of the image side lens face of the fifth lens 150 and the object side lens face of the sixth lens 160 and the focal length "f₅" of the fifth lens 150 is 0.401, which is less than 0.5. Further, the Abbe number "v₃" of the third lens 130 is 55.8, which is not less than 50. Therefore, as shown in FIG. 1D, the chromatic aberration can be reduced.

Second Embodiment

Figure 3A:
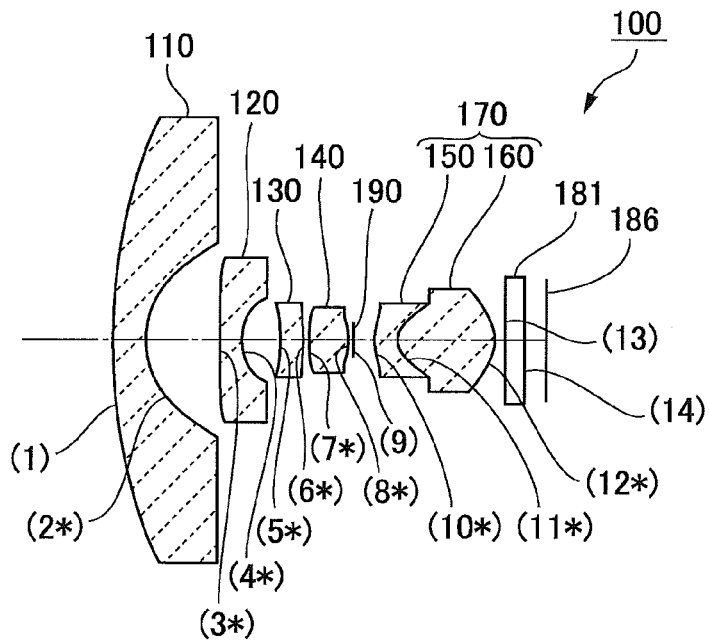
FIGS. 3A, 3B, 3C and 3D are explanatory views showing a wide-angle lens in accordance with a second embodiment of the present invention.
Figure 3B:
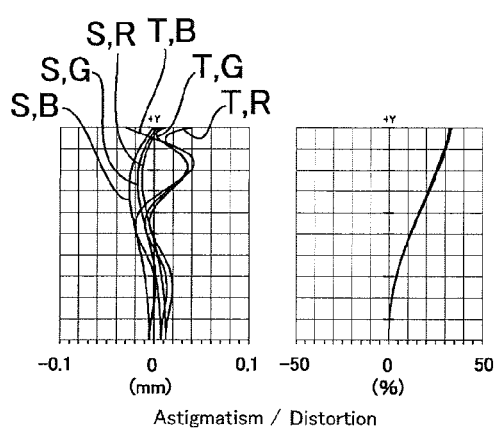
Figure 3D:
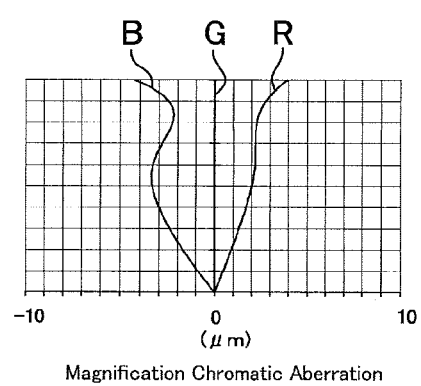
Figure 3C:
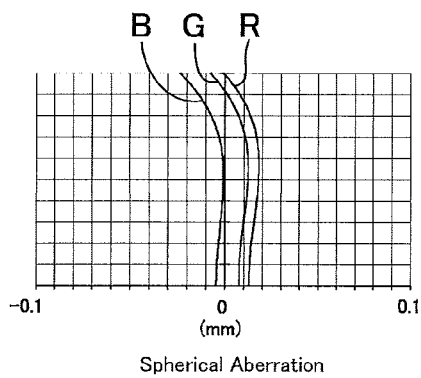
Figure 4:
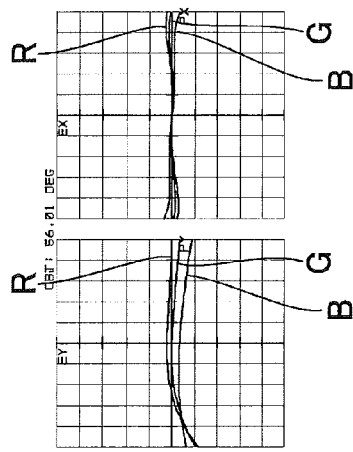
FIGS. 4A, 4B, 4C, 4D, 4E and 4F are explanatory views showing simulation results of lateral aberration in respective viewing angles of the wide-angle lens in accordance with the second embodiment of the present invention.
Figure 4:
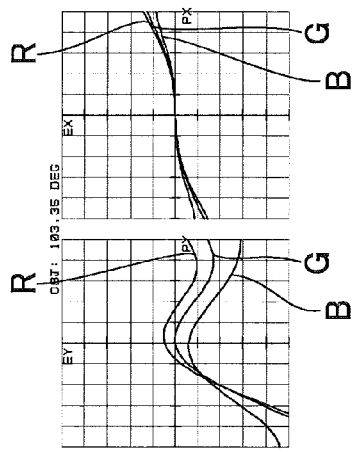
Figure 4:
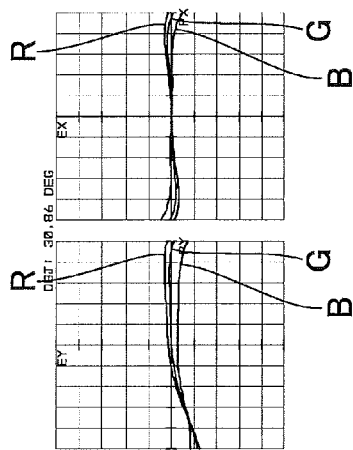
Figure 4:
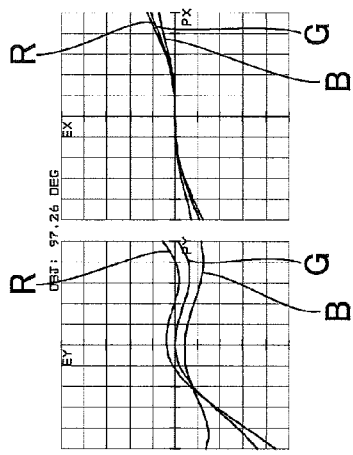
Figure 4:
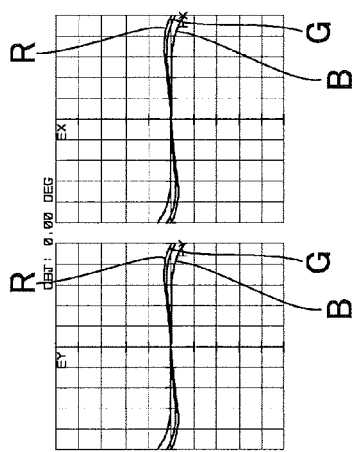
Figure 4:
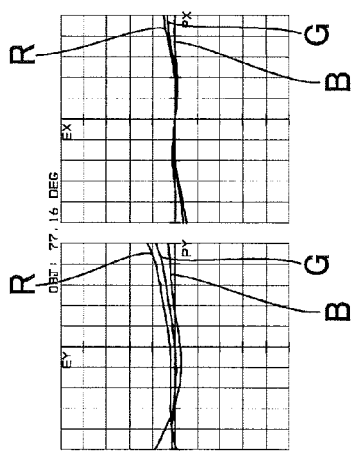

FIGS. 3A, 3B, 3C and 3D are explanatory views showing a wide-angle lens in accordance with a second embodiment of the present invention. FIG. 3A is an explanatory view showing a lens constitution, FIG. 3B is an explanatory view showing simulation results of the astigmatism and the distortion, FIG. 3C is an explanatory view showing simulation results of the spherical aberration, and FIG. 3D is an explanatory view showing simulation results of the magnification chromatic aberration. FIGS. 4A, 4B, 4C, 4D, 4E and 4F are explanatory views showing simulation results of the lateral aberration in respective viewing angles of the wide-angle lens in accordance with the second embodiment of the present invention. FIG. 4A is an explanatory view showing the lateral aberration when its viewing angle is 0°, FIG. 4B is an explanatory view showing the lateral aberration when its viewing angle is 30.86°, FIG. 4C is an explanatory view showing the lateral aberration when its viewing angle is 56.01°, FIG. 4D is an explanatory view showing the lateral aberration when its viewing angle is 77.16°, FIG. 4E is an explanatory view showing the lateral aberration when its viewing angle is 97.26°, and FIG. 4F is an explanatory view showing the lateral aberration when its viewing angle is 103.35°. In FIGS. 4A, 4B, 4C, 4D, 4E and 4F, the aberrations of red light "R" (wavelength 656 nm), green light "G" (wavelength 588 nm) and blue light "B" (wavelength 486 nm) are collectively shown.

As shown in FIG. 3A, a wide-angle lens 100 in this embodiment has, similarly to the first embodiment, a lens constitution of six lenses in five groups having, from an object side to an image side, a first lens 110, a second lens 120, a third lens 130, a fourth lens 140, a diaphragm 190 and a cemented lens 170 (fifth lens 150 and sixth lens 160). A filter 181 and an imaging element 186 are disposed on an image side with respect to the cemented lens 170. Respective constitutions of the wide-angle lens 100 constituted as described above are shown in Table 3.

concave surface facing the object side and a concave surface facing the image side. Both of the object side lens face (face 3) and the image side lens face (face 4) are aspherical surfaces. The third lens 130 is a plastic lens having negative power with a concave surface facing the object side and a convex surface facing the image side. Both of the object side lens face (face 5) and the image side lens face (face 6) are aspherical surfaces. The fourth lens 140 is a plastic lens with a convex surface facing the object side and a convex surface facing the image side. Both of the object side lens face (face 7) and the image side lens face (face 8) are aspherical surfaces.

The fifth lens 150 is a plastic lens with a convex surface facing the object side and a concave surface facing the image side. Both of the object side lens face (face 10) and the image side lens face (face 11) are aspherical surfaces. The sixth lens 160 is a plastic lens with a convex surface facing the object side and a convex surface facing the image side. Both of the object side lens face (face 11) and the image side lens face (face 12) are aspherical surfaces. The image side lens face of the fifth lens 150 and the object side lens face of the sixth lens 160 are cemented together to constitute the cemented lens 170 having positive power.

TABLE 3

| | | |
|---|---|---|
| Effective Focal Length | | 0.795 mm |
| Total Track | | 13.231 mm |
| Image Space F/# | | 2.0 |
| Max. Field Angle | | 207 deg |
| Horizontal Field Angle | | 195 deg |

| Surf | Radius | Thickness | Nd | vd | fn |
|---|---|---|---|---|---|
| 1 | 17.700 | 1.000 | 1.491 | 58.0 | −7.527 |
| 2* | 3.000 | 2.300 | | | |
| 3* | −98.100 | 0.650 | 1.531 | 55.8 | −2.556 |
| 4* | 1.380 | 1.190 | | | |
| 5* | −5.882 | 0.708 | 1.531 | 55.8 | −29.063 |
| 6* | −9.900 | 0.200 | | | |
| 7* | 7.186 | 1.194 | 1.635 | 24.0 | 3.398 |
| 8* | −2.884 | 0.150 | | | |
| 9(stop) | Infinity | 0.669 | | | |
| 10* | 2.743 | 0.700 | 1.635 | 24.0 | −1.707 |
| 11* | 0.700 | 2.990 | 1.531 | 55.8 | 1.926 |
| 12* | −1.068 | 0.250 | | | |
| 13 | Infinity | 0.700 | 1.517 | 64.1 | |
| 14 | Infinity | 0.530 | | | |

| Aspherical Coefficient | | | | | | |
|---|---|---|---|---|---|---|
| Surf | c (1/Radius) | K | A4 | A6 | A8 | A10 |
| 2 | 5.64972E−02 | −1.82000E+00 | 1.41000E−02 | −4.55000E−05 | 0.00000E+00 | 0.00000E+00 |
| 3 | 3.33333E−01 | 0.00000E+00 | 2.47000E−03 | 4.79000E−04 | −4.41000E−05 | 0.00000E+00 |
| 4 | −1.01937E−02 | −5.40000E−02 | −4.78000E−02 | 2.33000E−02 | 4.99000E−04 | 7.11000E−04 |
| 5 | 7.24638E−01 | 0.00000E+00 | −2.20000E−03 | −2.80000E−03 | −7.85000E−03 | 0.00000E+00 |
| 6 | −1.70010E−01 | 0.00000E+00 | −8.25000E−04 | −5.07000E−03 | 5.32000E−03 | 0.00000E+00 |
| 7 | −1.01010E−01 | 0.00000E+00 | −8.61000E−03 | 2.07000E−02 | −1.06000E−03 | 6.11000E−04 |
| 8 | 1.39159E−01 | 0.00000E+00 | 3.96000E−05 | 4.88000E−04 | 5.22000E−03 | 0.00000E+00 |
| 10 | 3.64564E−01 | 0.00000E+00 | −3.85000E−02 | 8.80000E−03 | −2.60000E−03 | 9.49000E−04 |
| 11 | 1.42857E+00 | −1.06000E+00 | 1.91000E−02 | −4.29000E−02 | 2.28000E−02 | −3.52000E−03 |
| 12 | −9.36330E−01 | −2.28000E+00 | −8.92000E−03 | −9.90000E−04 | 9.46000E−04 | 0.00000E+00 |

As can be seen from FIG. 3A and Table 3, a horizontal viewing angle of the wide-angle lens 100 in this embodiment is 195°. In the wide-angle lens 100 in this embodiment, the first lens 110 is a plastic lens having negative power in a meniscus shape with a convex surface facing the object side and a concave surface facing the image side. The object side lens face (face 1) is a spherical surface and the image side lens face (face 2) is an aspherical surface. The second lens 120 is a plastic lens having negative power with a As described above, also in the wide-angle lens 100 in this embodiment, similarly to the first embodiment, in addition to two lenses (the first lens 110 and the second lens 120) having negative power, the third lens 130 having negative power is provided. Therefore, angles (tangent angle θ) formed between the tangential lines to the concave surfaces on the image side of the first lens 110 and the second lens 120 and the optical axis "L" can be increased. Especially, the minimum value θmin of the tangent angle θ to the image side lens face (face 2) of the first lens 110 is 24.2° and, in the image side lens face (face 2) of the first lens 110, a value of the tangent angle θ is more than 20° at any position. Therefore, the first lens 110 is formed in an easily produced shape and thus the cost of the first lens 110 can be reduced.

In this embodiment, the third lens 130 is an aspherical lens and all the faces of the plastic lenses except the object side lens face (face 1) of the first lens 110 are aspherical surfaces. Further, the absolute value |f/f₃| of the ratio between the effective focal length "f" and the focal length "f₃" of the third lens 130 is 0.027, which is less than 0.2. Therefore, as shown in FIGS. 3B and 3C, and FIGS. 4A, 4B, 4C, 4D, 4E and 4F, the astigmatism, the distortion, the spherical aberration and the comatic aberration (lateral aberration) can be reduced and, even when the "F"-value is set brightly, the aberration can be corrected.

The absolute value |r$_{52.61}$/f$_5$| of the ratio between the radius of curvature r$_{52.61}$ of the image side lens face of the fifth lens 150 and the object side lens face of the sixth lens 160 and the focal length "f₅" of the fifth lens 150 is 0.410, which is less than 0.5. Further, the Abbe number "v₃" of the third lens 130 is 55.8, which is not less than 50. Therefore, as shown in FIG. 3D, the chromatic aberration can be reduced.

Third Embodiment

Figure 5A:
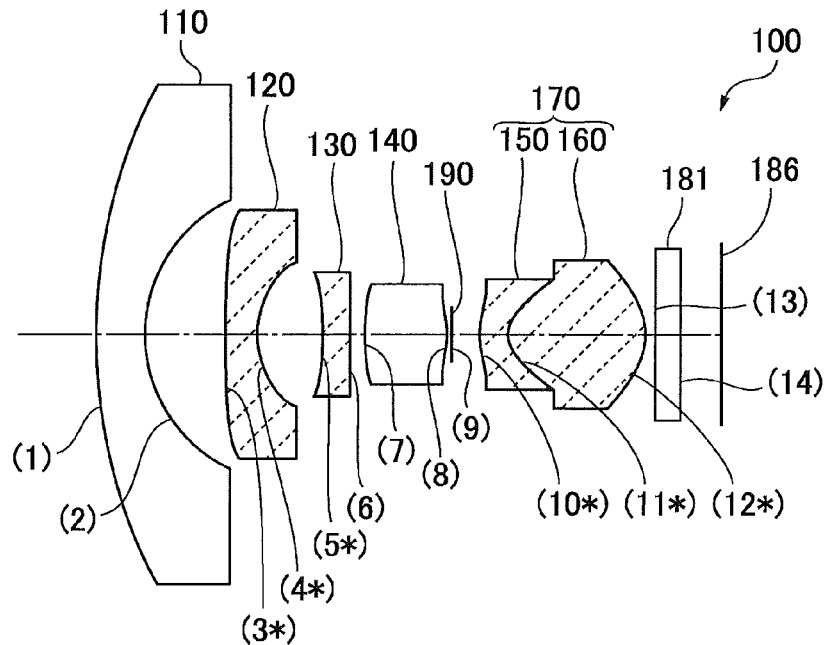
FIGS. 5A, 5B, 5C and 5D are explanatory views showing a wide-angle lens in accordance with a third embodiment of the present invention.
Figure 5B:
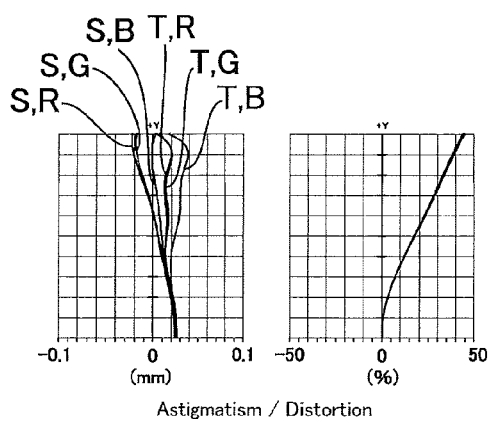
Figure 5D:
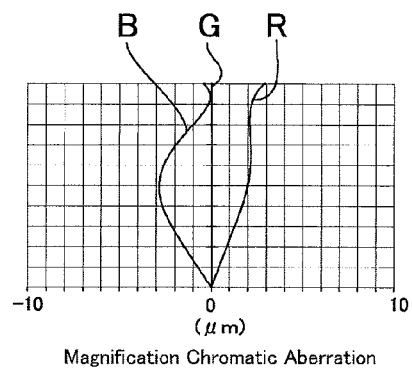
Figure 5C:
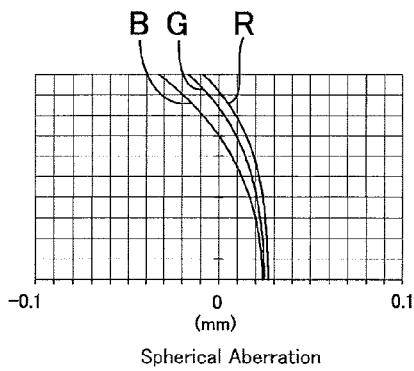
Figure 6C:
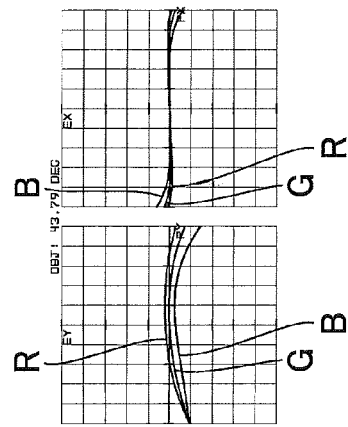
FIGS. 6A, 6B, 6C, 6D, 6E and 6F are explanatory views showing simulation results of lateral aberration in respective viewing angles of the wide-angle lens in accordance with the third embodiment of the present invention.
Figure 6F:
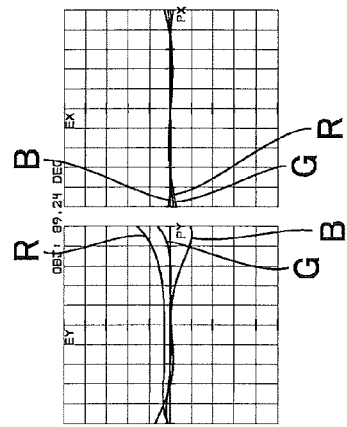
Figure 6B:
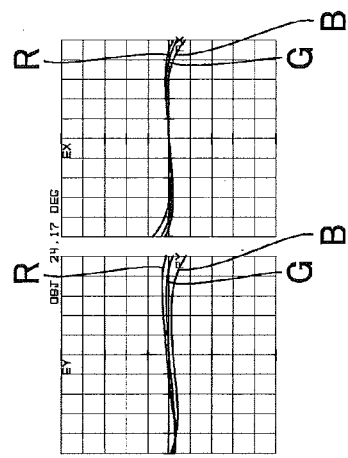
Figure 6E:
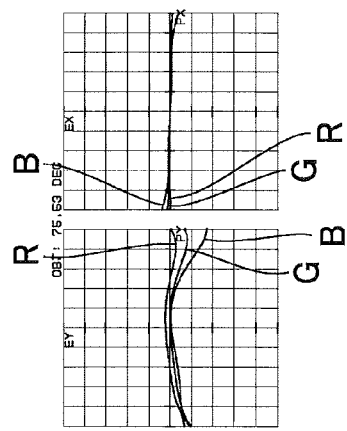
Figure 6A:
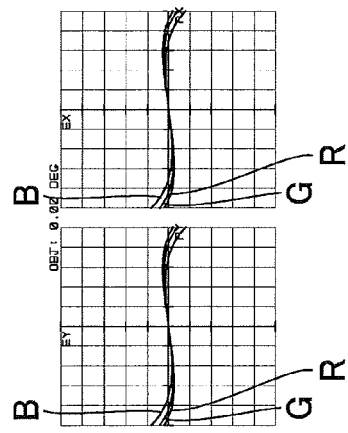
Figure 6D:
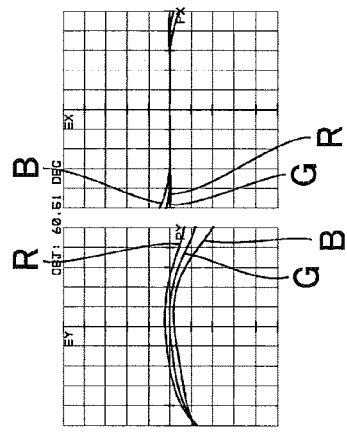

FIGS. 5A, 5B, 5C and 5D are explanatory views showing a wide-angle lens in accordance with a third embodiment of the present invention. FIG. 5A is an explanatory view showing a lens constitution, FIG. 5B is an explanatory view showing simulation results of the astigmatism and the distortion, FIG. 5C is an explanatory view showing simulation results of the spherical aberration, and FIG. 5D is an explanatory view showing simulation results of the magnification chromatic aberration. FIGS. 6A, 6B, 6C, 6D, 6E and 6F are explanatory views showing simulation results of the lateral aberration in respective viewing angles of the wide-angle lens in accordance with the third embodiment of the present invention. FIG. 6A is an explanatory view showing the lateral aberration when its viewing angle is 0°, FIG. 6B is an explanatory view showing the lateral aberration when its viewing angle is 24.17°, FIG. 6C is an explanatory view showing the lateral aberration when its viewing angle is 43.79°, FIG. 6D is an explanatory view showing the lateral aberration when its viewing angle is 60.51°, FIG. 6E is an explanatory view showing the lateral aberration when its viewing angle is 75.53°, and FIG. 6F is an explanatory view showing the lateral aberration when its viewing angle is 89.24°.

As shown in FIG. 5A, a wide-angle lens 100 in this embodiment has, similarly to the first embodiment, a lens constitution of six lenses in five groups having, from an object side to an image side, a first lens 110, a second lens 120, a third lens 130, a fourth lens 140, a diaphragm 190 and a cemented lens 170 (fifth lens 150 and sixth lens 160). A filter 181 and an imaging element 186 are disposed on an image side with respect to the cemented lens 170. Respective constitutions of the wide-angle lens 100 constituted as described above are shown in Table 4.

TABLE 4

| | | |
|---|---|---|
| Effective Focal Length | 1.000 mm | |
| Total Track | 16.506 mm | |
| Image Space F/# | 2.0 | |
| Max. Field Angle | 192 deg | |
| Horizontal Field Angle | 151 deg | |

| Surf | Radius | Thickness | Nd | vd | fn |
|---|---|---|---|---|---|
| 1 | 14.730 | 1.300 | 1.834 | 42.7 | −6.966 |
| 2 | 4.000 | 2.150 | | | |
| 3* | −33.660 | 0.800 | 1.531 | 55.8 | −3.878 |
| 4* | 2.212 | 1.740 | | | |
| 5* | −7.883 | 0.700 | 1.531 | 55.8 | −11.775 |
| 6 | 31.200 | 0.400 | | | |
| 7 | 6.728 | 2.170 | 1.847 | 23.8 | 3.705 |
| 8 | −5.008 | 0.150 | | | |
| 9(stop) | Infinity | 0.740 | | | |
| 10* | 3.495 | 0.700 | 1.635 | 24.0 | −1.595 |
| 11* | 0.724 | 3.645 | 1.531 | 55.8 | 2.134 |
| 12* | −1.496 | 0.250 | | | |
| 13 | Infinity | 0.700 | 1.517 | 64.1 | |
| 14 | Infinity | 1.061 | | | |

Aspherical Coefficient

| Surf | c (1/Radius) | K | A4 | A6 | A8 | A10 |
|---|---|---|---|---|---|---|
| 3 | −2.97089E−02 | 0.00000E+00 | 4.52000E−03 | −3.21000E−05 | 5.63000E−07 | 0.00000E+00 |
| 4 | 4.52080E−01 | −3.60000E−02 | −2.84000E−02 | 1.01000E−02 | −2.40000E−03 | 3.70000E−04 |
| 5 | −1.26855E−01 | 0.00000E+00 | −1.05000E−02 | 2.97000E−03 | −6.22000E−04 | 0.00000E+00 |
| 10 | 2.86123E−01 | 0.00000E+00 | −3.02000E−02 | 6.44000E−03 | −8.31000E−04 | −2.79000E−04 |
| 11 | 1.38122E+00 | −1.24000E+00 | −1.87000E−02 | 6.19000E−03 | 7.95000E−04 | −4.78000E−04 |
| 12 | −6.68449E−01 | −2.15000E+00 | 2.40000E−03 | −1.66000E−03 | 2.39000E−04 | 0.00000E+00 |

As can be seen from FIG. 5A and Table 4, a horizontal viewing angle of the wide-angle lens 100 in this embodiment is 151°. In the wide-angle lens 100 in this embodiment, the first lens 110 is a glass lens having negative power in a meniscus shape with a convex surface facing the object side and a concave surface facing the image side. Both of the object side lens face (face 1) and the image side lens face (face 2) are spherical surfaces. The second lens 120 is a plastic lens having negative power with a concave surface facing the object side and a concave surface facing the image side. Both of the object side lens face (face 3) and the image side lens face (face 4) are aspherical surfaces. The third lens 130 is a plastic lens having negative power with a concave surface facing the object side and a concave surface facing the image side. The object side lens face (face 5) is an aspherical surface and the image side lens face (face 6) is a spherical surface. The fourth lens 140 is a glass lens with a convex surface facing the object side and a convex surface facing the image side. Both of the object side lens face (face 7) and the image side lens face (face 8) are spherical surfaces.

The fifth lens 150 is a plastic lens having negative power with a convex surface facing the object side and a concave surface facing the image side. Both of the object side lens face (face 10) and the image side lens face (face 11) are aspherical surfaces. The sixth lens 160 is a plastic lens with a convex surface facing the object side and a convex surface facing the image side. Both of the object side lens face (face 11) and the image side lens face (face 12) are aspherical surfaces. The image side lens face of the fifth lens 150 and the object side lens face of the sixth lens 160 are cemented together to constitute the cemented lens 170 having positive power.

As described above, also in the wide-angle lens 100 in this embodiment, similarly to the first embodiment, in addition to two lenses (the first lens 110 and the second lens 120) having negative power, the third lens 130 having negative power is provided. Therefore, angles (tangent angle θ) formed between the tangential lines to the concave surfaces on the image side of the first lens 110 and the second lens 120 and the optical axis "L" can be increased. Especially, the minimum value θmin of the tangent angle θ to the image side lens face (face 2) of the first lens 110 is 25.4° and, in the image side lens face (face 2) of the first lens 110, a value of the tangent angle θ is more than 20° at any position. Therefore, the first lens 110 is formed in an easily produced shape and thus the cost of the first lens 110 can be reduced.

In this embodiment, the third lens 130 is an aspherical lens. Further, the absolute value $|f/f_3|$ of the ratio between the effective focal length "f" and the focal length "$f_3$" of the third lens 130 is 0.085, which is less than 0.2. Therefore, as shown in FIGS. 5B and 5C, and FIGS. 6A, 6B, 6C, 6D, 6E and 6F, the astigmatism, the distortion, the spherical aberration and the comatic aberration (lateral aberration) can be reduced and, even when the "F"-value is set brightly, the aberration can be corrected.

The fourth lens 140 is a glass lens and thus lowering of the resolution due to temperature change can be suppressed.

The absolute value $|r_{52.61}/f_5|$ of the ratio between the radius of curvature $r_{52.61}$ of the image side lens face of the fifth lens 150 and the object side lens face of the sixth lens 160 and the focal length "$f_5$" of the fifth lens 150 is 0.454, which is less than 0.5. Further, the Abbe number "$v_3$" of the third lens 130 is 55.8, which is not less than 50. Therefore, as shown in FIG. 5D, the chromatic aberration can be reduced.

Fourth Embodiment

Figure 7A:
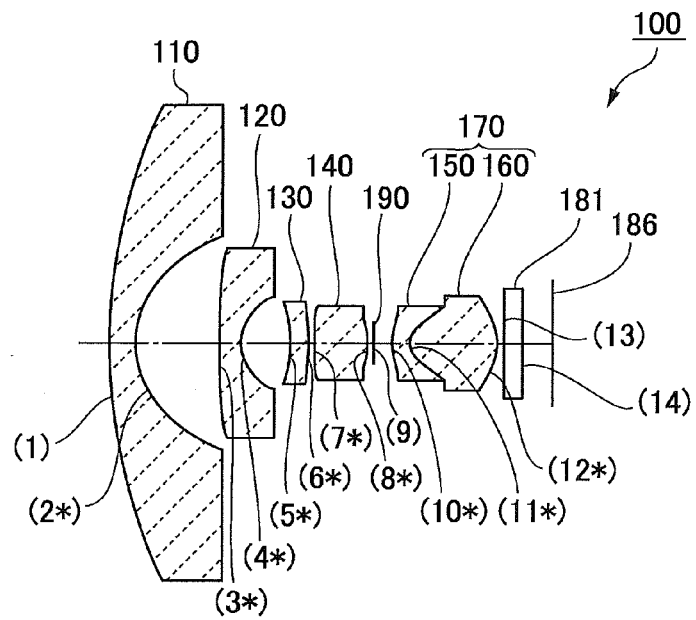
FIGS. 7A, 7B, 7C and 7D are explanatory views showing a wide-angle lens in accordance with a fourth embodiment of the present invention.
Figure 7B:
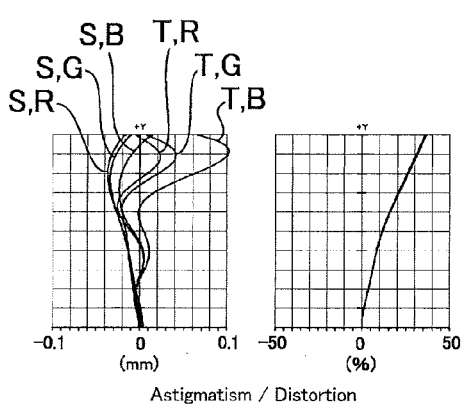
Figure 7D:
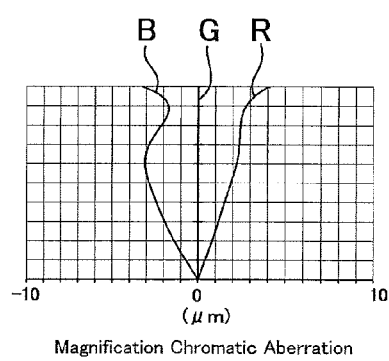
Figure 7C:
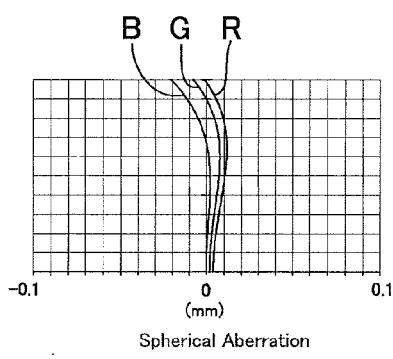
Figure 8:
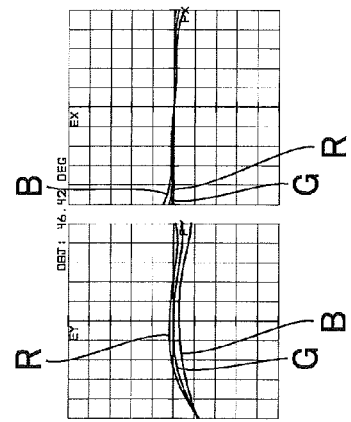
FIGS. 8A, 8B, 8C, 8D, 8E and 8F are explanatory views showing simulation results of lateral aberration in respective viewing angles of the wide-angle lens in accordance with the fourth embodiment of the present invention.
Figure 8:
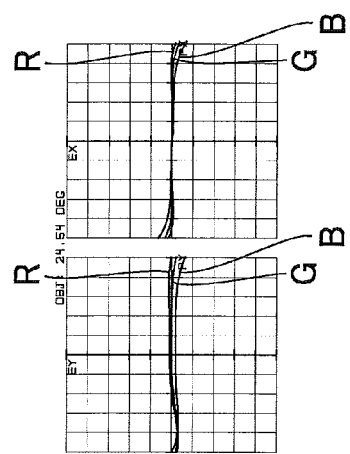
Figure 8:
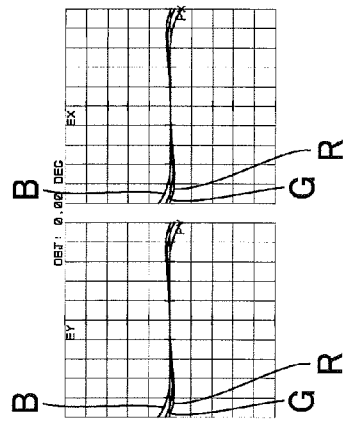
Figure 8:
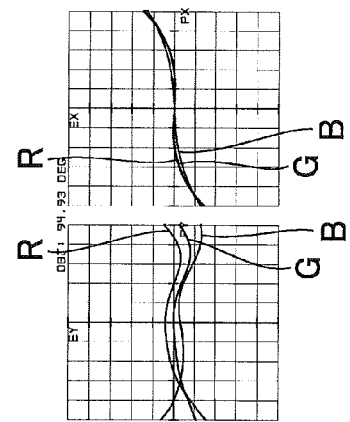
Figure 8:
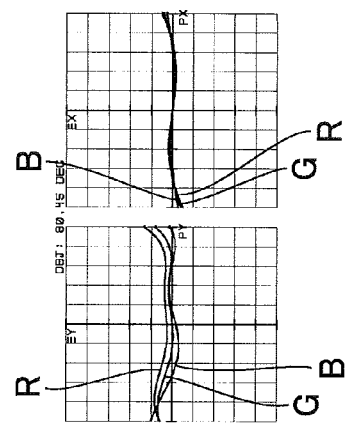
Figure 8:
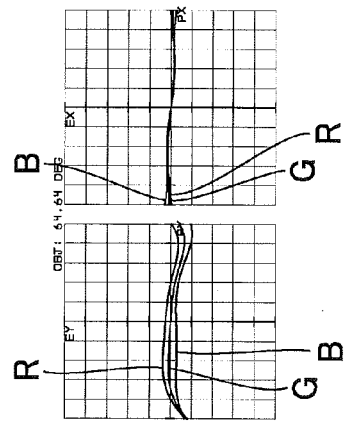

FIGS. 7A, 7B, 7C and 7D are explanatory views showing a wide-angle lens in accordance with a fourth embodiment of the present invention. FIG. 7A is an explanatory view showing a lens constitution, FIG. 7B is an explanatory view showing simulation results of the astigmatism and the distortion, FIG. 7C is an explanatory view showing simulation results of the spherical aberration, and FIG. 7D is an explanatory view showing simulation results of the magnification chromatic aberration. FIGS. 8A, 8B, 8C, 8D, 8E and 8F are explanatory views showing simulation results of the lateral aberration in respective viewing angles of the wide-angle lens in accordance with the fourth embodiment of the present invention. FIG. 8A is an explanatory view showing the lateral aberration when its viewing angle is 0°, FIG. 8B is an explanatory view showing the lateral aberration when its viewing angle is 24.54°, FIG. 8C is an explanatory view showing the lateral aberration when its viewing angle is 46.42°, FIG. 8D is an explanatory view showing the lateral aberration when its viewing angle is 64.64°, FIG. 8E is an explanatory view showing the lateral aberration when its viewing angle is 80.45°, and FIG. 8F is an explanatory view showing the lateral aberration when its viewing angle is 94.93°.

As shown in FIG. 7A, a wide-angle lens 100 in this embodiment has, similarly to the first embodiment, a lens constitution of six lenses in five groups having, from an object side to an image side, a first lens 110, a second lens 120, a third lens 130, a fourth lens 140, a diaphragm 190 and a cemented lens 170 (fifth lens 150 and sixth lens 160). A filter 181 and an imaging element 186 are disposed on an image side with respect to the cemented lens 170. Respective constitutions of the wide-angle lens 100 constituted as described above are shown in Table 5.

TABLE 5

| Effective Focal Length | 0.994 mm |
| Total Track | 16.974 mm |
| Image Space F/# | 2.0 |
| Max. Field Angle | 207 deg |
| Horizontal Field Angle | 161 deg |

| Surf | Radius | Thickness | Nd | vd | fn |
|---|---|---|---|---|---|
| 1 | 21.440 | 1.000 | 1.491 | 58.0 | −9.422 |
| 2* | 3.746 | 3.205 | | | |
| 3* | 363.000 | 0.800 | 1.531 | 55.8 | −3.401 |
| 4* | 1.796 | 1.895 | | | |
| 5* | −5.124 | 0.700 | 1.531 | 55.8 | −16.300 |
| 6* | −13.150 | 0.200 | | | |
| 7* | 9.962 | 2.044 | 1.635 | 24.0 | 4.277 |

TABLE 5-continued

| | | | | | |
|---|---|---|---|---|---|
| 8* | −3.436 | 0.150 | | | |
| 9(stop) | Infinity | 0.776 | | | |
| 10* | 3.043 | 0.700 | 1.635 | 24.0 | −1.834 |
| 11* | 0.767 | 3.375 | 1.531 | 55.8 | 1.855 |
| 12* | −1.821 | 0.250 | | | |
| 13 | Infinity | 0.700 | 1.517 | 64.1 | |
| 14 | Infinity | 1.179 | | | |

Aspherical Coefficient

| Surf | c (1/Radius) | K | A4 | A6 | A8 | A10 |
|---|---|---|---|---|---|---|
| 2 | 4.66418E−02 | −5.00000E+00 | 8.20000E−03 | −9.60000E−05 | 0.00000E+00 | 0.00000E+00 |
| 3 | 2.66951E−01 | 0.00000E+00 | 1.20000E−03 | 2.80000E−05 | −1.31000E−06 | 0.00000E+00 |
| 4 | 2.75482E−03 | −1.61000E−01 | −2.07000E−02 | 2.75000E−03 | 1.32000E−04 | −2.17000E−05 |
| 5 | 5.56793E−01 | 0.00000E+00 | −5.75000E−04 | −5.31000E−04 | −7.56000E−04 | 0.00000E+00 |
| 6 | −1.95160E−01 | 0.00000E+00 | 1.75000E−04 | −1.71000E−03 | 2.44000E−04 | 0.00000E+00 |
| 7 | −7.60456E−02 | 0.00000E+00 | −3.89000E−03 | 2.67000E−03 | 2.45000E−05 | 3.38000E−06 |
| 8 | 1.00381E−01 | 0.00000E+00 | 8.23000E−03 | −7.94000E−04 | 4.34000E−04 | 0.00000E+00 |
| 10 | 3.28623E−01 | 0.00000E+00 | −1.19000E−02 | 1.51000E−03 | −1.67000E−04 | −1.27000E−05 |
| 11 | 1.30378E+00 | −1.06000E+00 | −3.19000E−03 | −7.74000E−03 | 5.73000E−03 | −8.92000E−04 |
| 12 | −5.49149E−01 | −2.82300E+00 | −4.15000E−03 | 1.01000E−03 | 3.33000E−04 | 0.00000E+00 |

As can be seen from FIG. 7A and Table 5, a horizontal viewing angle of the wide-angle lens 100 in this embodiment is 161°. In the wide-angle lens 100 in this embodiment, the first lens 110 is a plastic lens having negative power in a meniscus shape with a convex surface facing the object side and a concave surface facing the image side. The object side lens face (face 1) is a spherical surface and the image side lens face (face 2) is an aspherical surface. The second lens 120 is a plastic lens having negative power with a convex surface facing the object side and a concave surface facing the image side. Both of the object side lens face (face 3) and the image side lens face (face 4) are aspherical surfaces. The third lens 130 is a plastic lens in a negative meniscus shape with a concave surface facing the object side and a convex surface facing the image side. Both of the object side lens face (face 5) and the image side lens face (face 6) are aspherical surfaces. The fourth lens 140 is a plastic lens with a convex surface facing the object side and a convex surface facing the image side. Both of the object side lens face (face 7) and the image side lens face (face 8) are aspherical surfaces.

The fifth lens 150 is a plastic lens with a convex surface facing the object side and a concave surface facing the image side. Both of the object side lens face (face 10) and the image side lens face (face 11) are aspherical surfaces. The sixth lens 160 is a plastic lens with a convex surface facing the object side and a convex surface facing the image side. Both of the object side lens face (face 11) and the image side lens face (face 12) are aspherical surfaces. The image side lens face of the fifth lens 150 and the object side lens face of the sixth lens 160 are cemented together to constitute the cemented lens 170 having positive power.

As described above, also in the wide-angle lens 100 in this embodiment, similarly to the first embodiment, in addition to two lenses (the first lens 110 and the second lens 120) having negative power, the third lens 130 having negative power is provided. Therefore, angles (tangent angle θ) formed between the tangential lines to the concave surfaces on the image side of the first lens 110 and the second lens 120 and the optical axis "L" can be increased. Especially, the minimum value θmin of the tangent angle θ to the image side lens face (face 2) of the first lens 110 is 24.2° and, in the image side lens face (face 2) of the first lens 110, a value of the tangent angle θ is more than 20° at any position. Therefore, the first lens 110 is formed in an easily produced shape and thus the cost of the first lens 110 can be reduced.

In this embodiment, the third lens 130 is an aspherical lens and all the faces of the plastic lenses except the object side lens face (face 1) of the first lens 110 are aspherical surfaces. Further, the absolute value $|f/f_3|$ of the ratio between the effective focal length "f" and the focal length "$f_3$" of the third lens 130 is 0.061, which is less than 0.2. Therefore, as shown in FIGS. 7B and 7C, and FIGS. 8A, 8B, 8C, 8D, 8E and 8F, the astigmatism, the distortion, the spherical aberration and the comatic aberration (lateral aberration) can be reduced and, even when the "F"-value is set brightly, the aberration can be corrected.

The absolute value $|r_{52.61}/f_5|$ of the ratio between the radius of curvature $r_{52.61}$ of the image side lens face of the fifth lens 150 and the object side lens face of the sixth lens 160 and the focal length "$f_5$" of the fifth lens 150 is 0.418, which is less than 0.5. Further, the Abbe number "$v_3$" of the third lens 130 is 55.8, which is not less than 50. Therefore, as shown in FIG. 7D, the chromatic aberration can be reduced.

Fifth Embodiment

Figure 9A:
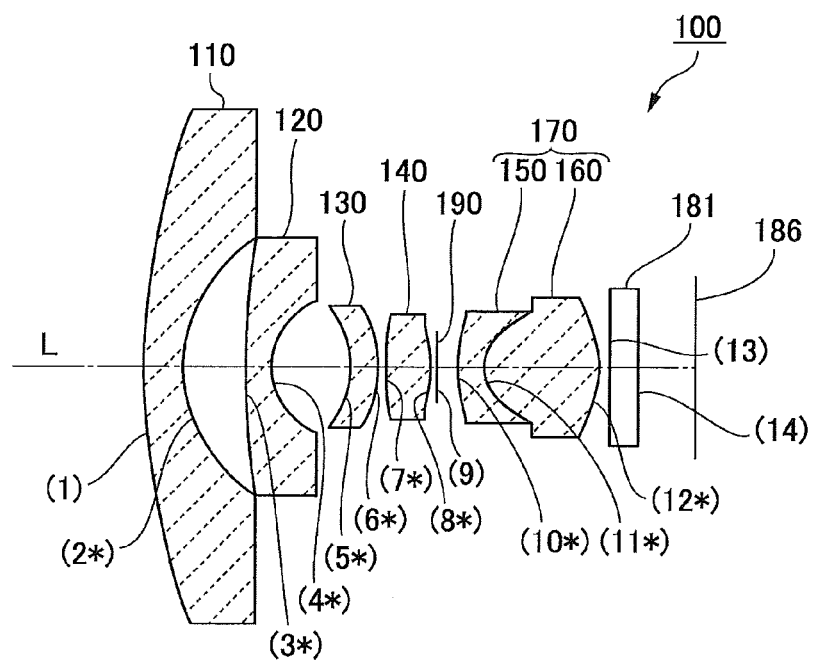
FIGS. 9A, 9B, 9C and 9D are explanatory views showing a wide-angle lens in accordance with a fifth embodiment of the present invention.
Figure 9B:
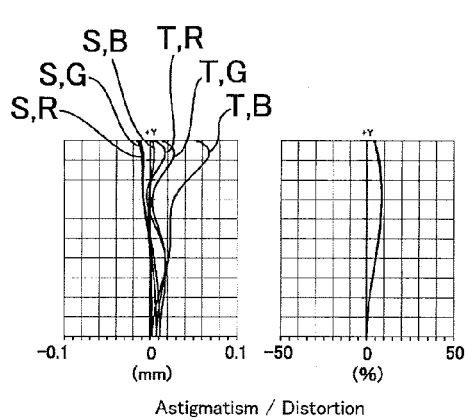
Figure 9D:
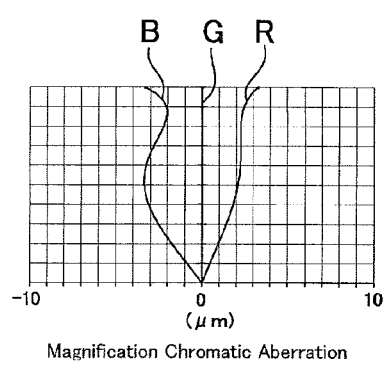
Figure 9C:
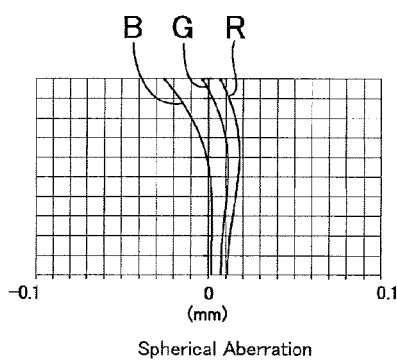
Figure 10:
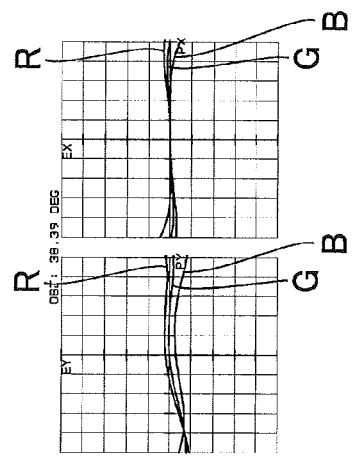
FIGS. 10A, 10B, 10C, 10D, 10E and 10F are explanatory views showing simulation results of lateral aberration in respective viewing angles of the wide-angle lens in accordance with the fifth embodiment of the present invention.
Figure 10:
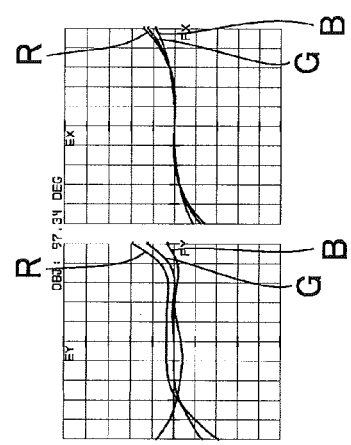
Figure 10:
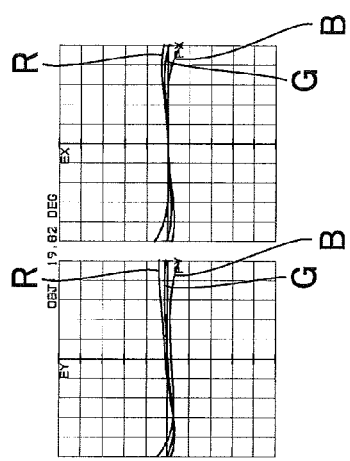
Figure 10:
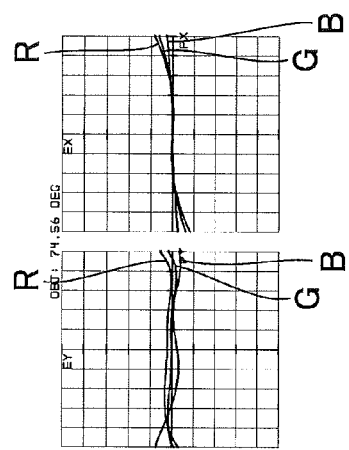
Figure 10:
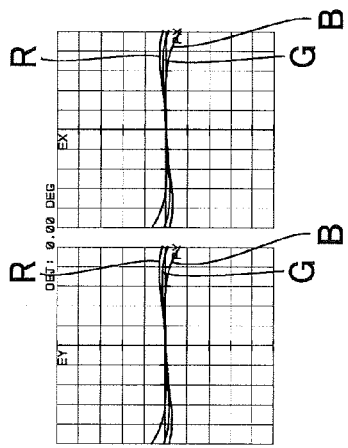
Figure 10:
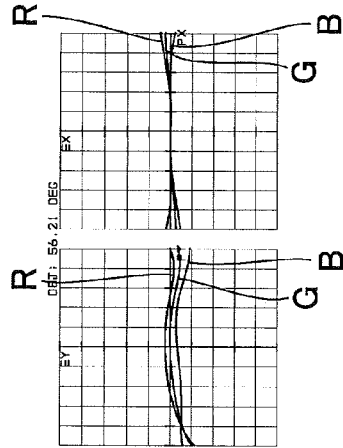

FIGS. 9A, 9B, 9C and 9D are explanatory views showing a wide-angle lens in accordance with a fifth embodiment of the present invention. FIG. 9A is an explanatory view showing a lens constitution, FIG. 9B is an explanatory view showing simulation results of the astigmatism and the distortion, FIG. 9C is an explanatory view showing simulation results of the spherical aberration, and FIG. 9D is an explanatory view showing simulation results of the magnification chromatic aberration. FIGS. 10A, 10B, 10C, 10D, 10E and 10F are explanatory views showing simulation results of the lateral aberration in respective viewing angles of the wide-angle lens in accordance with the fifth embodiment of the present invention. FIG. 10A is an explanatory view showing lateral the aberration when its viewing angle is 0°, FIG. 10B is an explanatory view showing the lateral aberration when its viewing angle is 19.82°, FIG. 10C is an explanatory view showing the lateral aberration when its viewing angle is 38.39°, FIG. 10D is an explanatory view showing the lateral aberration when its viewing angle is 56.21°, FIG. 10E is an explanatory view showing the lateral aberration when its viewing angle is 74.56°, and FIG. 10F is an explanatory view showing the lateral aberration when its viewing angle is 97.34°.

As shown in FIG. 9A, a wide-angle lens 100 in this embodiment has, similarly to the first embodiment, a lens constitution of six lenses in five groups having, from an object side to an image side, a first lens 110, a second lens 120, a third lens 130, a fourth lens 140, a diaphragm 190 and a cemented lens 170 (fifth lens 150 and sixth lens 160). A filter 181 and an imaging element 186 are disposed on an image side with respect to the cemented lens 170. Respective constitutions of the wide-angle lens 100 constituted as described above are shown in Table 6.

a convex surface facing the image side. Both of the object side lens face (face 7) and the image side lens face (face 8) are aspherical surfaces.

The fifth lens 150 is a plastic lens with a convex surface facing the object side and a concave surface facing the image side. Both of the object side lens face (face 10) and the image side lens face (face 11) are aspherical surfaces. The sixth lens 160 is a plastic lens with a convex surface facing the object side and a convex surface facing the image side. Both of the object side lens face (face 11) and the image side lens face (face 12) are aspherical surfaces. The image side lens face of the fifth lens 150 and the object side lens face

TABLE 6

| | | | | |
|---|---|---|---|---|
| Effective Focal Length | | 1.274 mm | | |
| Total Track | | 14.225 mm | | |
| Image Space F/# | | 2.0 | | |
| Max. Field Angle | | 202 deg | | |
| Horizontal Field Angle | | 149 deg | | |

| Surf | Radius | Thickness | Nd | vd | fn |
|---|---|---|---|---|---|
| 1 | 17.745 | 1.000 | 1.491 | 58.0 | −8.663 |
| 2* | 3.367 | 1.620 | | | |
| 3* | 34.500 | 0.650 | 1.531 | 55.8 | −3.535 |
| 4* | 1.769 | 2.037 | | | |
| 5* | −2.279 | 0.700 | 1.531 | 55.8 | −25.838 |
| 6* | −3.024 | 0.200 | | | |
| 7* | 10.310 | 1.180 | 1.635 | 24.0 | 4.368 |
| 8* | −3.625 | 0.150 | | | |
| 9(stop) | Infinity | 0.541 | | | |
| 10* | 3.329 | 0.700 | 1.635 | 24.0 | −1.858 |
| 11* | 0.800 | 2.962 | 1.531 | 55.8 | 1.668 |
| 12* | −2.344 | 0.250 | | | |
| 13 | Infinity | 0.700 | 1.517 | 64.1 | |
| 14 | Infinity | 1.535 | | | |

Aspherical Coefficient

| Surf | c (1/Radius) | K | A4 | A6 | A8 | A10 |
|---|---|---|---|---|---|---|
| 2 | 5.63539E−02 | −1.00000E+00 | 9.45000E−04 | 1.20000E−04 | 0.00000E+00 | 0.00000E+00 |
| 3 | 2.97000E−01 | 0.00000E+00 | 6.79000E−04 | 4.36000E−05 | −1.52000E−07 | 0.00000E+00 |
| 4 | 2.89855E−02 | 1.00000E−03 | −6.11000E−03 | 3.02000E−04 | −3.03000E−04 | 0.00000E+00 |
| 5 | 5.65291E−01 | 0.00000E+00 | 1.56000E−04 | 6.45000E−04 | −1.36000E−03 | 0.00000E+00 |
| 6 | −4.38789E−01 | 0.00000E+00 | 1.29000E−04 | −1.05000E−03 | −1.65000E−04 | 0.00000E+00 |
| 7 | −3.30688E−01 | 0.00000E+00 | −2.39000E−03 | 1.97000E−03 | 4.95000E−04 | 0.00000E+00 |
| 8 | 9.69932E−02 | 0.00000E+00 | 1.02000E−02 | −1.19000E−03 | 1.15000E−03 | 0.00000E+00 |
| 10 | 3.00391E−01 | 0.00000E+00 | −6.17000E−03 | 6.37000E−04 | 6.60000E−05 | 0.00000E+00 |
| 11 | 1.25000E+00 | −1.14000E+00 | 1.14000E−02 | 4.46000E−04 | 1.57500E−03 | 0.00000E+00 |
| 12 | −4.26621E−01 | −3.15000E+00 | −2.29000E−03 | 7.13000E−04 | 2.49000E−04 | 0.00000E+00 |

As can be seen from FIG. 9A and Table 6, a horizontal viewing angle of the wide-angle lens 100 in this embodiment is 149°. In the wide-angle lens 100 in this embodiment, the first lens 110 is a plastic lens having negative power in a meniscus shape with a convex surface facing the object side and a concave surface facing the image side. The object side lens face (face 1) is a spherical surface and the image side lens face (face 2) is an aspherical surface. The second lens 120 is a plastic lens having negative power with a convex surface facing the object side and a concave surface facing the image side. Both of the object side lens face (face 3) and the image side lens face (face 4) are aspherical surfaces. The third lens 130 is a plastic lens in a negative meniscus shape with a concave surface facing the object side and a convex surface facing the image side. Both of the object side lens face (face 5) and the image side lens face (face 6) are aspherical surfaces. The fourth lens 140 is a plastic lens with a convex surface facing the object side and of the sixth lens 160 are cemented together to constitute the cemented lens 170 having positive power.

As described above, also in the wide-angle lens 100 in this embodiment, similarly to the first embodiment, in addition to two lenses (the first lens 110 and the second lens 120) having negative power, the third lens 130 having negative power is provided. Therefore, angles (tangent angle θ) formed between the tangential lines to the concave surfaces on the image side of the first lens 110 and the second lens 120 and the optical axis "L" can be increased. Especially, the minimum value θmin of the tangent angle θ to the image side lens face (face 2) of the first lens 110 is 45.0° and, in the image side lens face (face 2) of the first lens 110, a value of the tangent angle θ is more than 20° at any position. Therefore, the first lens 110 is formed in an easily produced shape and thus the cost of the first lens 110 can be reduced.

In this embodiment, the third lens 130 is an aspherical lens and all the faces of the plastic lenses except the object side lens face (face 1) of the first lens 110 are aspherical surfaces. Further, the absolute value $|f/f_3|$ of the ratio between the effective focal length "f" and the focal length "$f_3$" of the third lens 130 is 0.049, which is less than 0.2. Therefore, as shown in FIGS. 9B and 9C, and FIGS. 10A, 10B, 10C, 10D, 10E and 10F, the astigmatism, the distortion, the spherical aberration and the comatic aberration (lateral aberration) can be reduced and, even when the "F"-value is set brightly, the aberration can be corrected.

The absolute value $|r_{52.61}/f_5|$ of the ratio between the radius of curvature $r_{52.61}$ of the image side lens face of the fifth lens 150 and the object side lens face of the sixth lens 160 and the focal length "$f_5$" of the fifth lens 150 is 0.431, which is less than 0.5. Further, the Abbe number "$v_3$" of the third lens 130 is 55.8, which is not less than 50. Therefore, as shown in FIG. 9D, the chromatic aberration can be reduced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A wide-angle lens whose horizontal viewing angle is 130° or more and which has a lens constitution of six lenses in five groups, the wide-angle lens comprising:
   a first lens arranged first from an object side and is a plastic lens or a glass lens having negative power with a convex surface facing the object side and a concave surface facing an image side;
   a second lens arranged second from the object side and is a plastic lens having negative power with a concave surface facing the image side, wherein at least one of an object side lens face and an image side lens face is an aspherical surface;
   a third lens arranged third from the object side and is a plastic lens having negative power with a concave surface facing the object side, wherein at least one of an object side lens face and an image side lens face is an aspherical surface;
   a fourth lens arranged fourth from the object side and is a plastic lens or a glass lens having positive power with a convex surface facing the image side;
   a fifth lens arranged fifth from the object side and is a plastic lens;
   a sixth lens arranged sixth from the object side and is a plastic lens, wherein the fifth lens and the sixth lens constitute a cemented lens having positive power;
   a diaphragm which is disposed between the fourth lens and the cemented lens;
   wherein when an effective focal length is "f" and a focal length of the third lens is "f3", the effective focal length "f" and the focal length "f3" satisfy a following relationship;

$|f/f3|<0.2$.

2. The wide-angle lens according to claim 1, wherein when a radius of curvature of an image side lens face of the fifth lens and an object side lens face of the sixth lens is "r52.61" and a focal length of the fifth lens is "f5", the radius of curvature "r52.61" and the focal length "f5" satisfy a following relationship;

$|r52.61/f5|<0.5$.

3. The wide-angle lens according to claim 1, wherein when an Abbe number of the third lens is "v3", the Abbe number "v3" satisfies a following relationship;

$v3>50$.

4. The wide-angle lens according to claim 3, wherein an angle formed between a tangential line to an image side lens face of the first lens and an optical axis is "θ", the angle "θ" satisfies a following relationship at any position of the image side lens face of the first lens;

$θ>20°$.

5. The wide-angle lens according to claim 4, wherein the fourth lens is a glass lens.

6. The wide-angle lens according to claim 5, wherein all lens faces of the plastic lenses except an object side lens face of the first lens are aspherical surfaces.

7. The wide-angle lens according to claim 1, wherein when an Abbe number of the third lens is "$v_3$", the Abbe number "$v_3$" satisfies a following relationship;

$v_3>50$.

8. The wide-angle lens according to claim 7, wherein an angle formed between a tangential line to an image side lens face of the first lens and an optical axis is "θ", the angle "θ" satisfies a following relationship at any position of the image side lens face of the first lens;

$θ>20°$.

9. The wide-angle lens according to claim 8, wherein the fourth lens is a glass lens.

10. The wide-angle lens according to claim 1, wherein an angle formed between a tangential line to an image side lens face of the first lens and an optical axis is "θ", the angle "θ" satisfies a following relationship at any position of the image side lens face of the first lens;

$θ>20°$.

11. The wide-angle lens according to claim 10, wherein the fourth lens is a glass lens.

12. The wide-angle lens according to claim 2, wherein an angle formed between a tangential line to an image side lens face of the first lens and an optical axis is "θ", the angle "θ" satisfies a following relationship at any position of the image side lens face of the first lens;

$θ>20°$.

13. The wide-angle lens according to claim 12, wherein the fourth lens is a glass lens.

14. The wide-angle lens according to claim 3, wherein the fourth lens is a glass lens.

15. The wide-angle lens according to claim 1, wherein the first lens is a plastic lens, and all lens faces of the plastic lenses except an object side lens face of the first lens are aspherical surfaces.

* * * * *